United States Patent
Desuche et al.

(10) Patent No.: US 7,353,417 B2
(45) Date of Patent: Apr. 1, 2008

(54) MICROCONTROLLER WITH SYNCHRONISED ANALOG TO DIGITAL CONVERTER

(75) Inventors: Jean Desuche, Carquefou (FR); Etienne Bouin, Grandchamp des Fontaines (FR)

(73) Assignee: Atmel Nantes SA, Nantes Cedex (FR)

( * ) Notice: Subject to any disclaimer, the term of this patent is extended or adjusted under 35 U.S.C. 154(b) by 391 days.

(21) Appl. No.: 11/038,654

(22) Filed: Jan. 19, 2005

(65) Prior Publication Data

US 2005/0248901 A1 Nov. 10, 2005

(30) Foreign Application Priority Data

Jan. 20, 2004 (FR) .................................. 04 00507

(51) Int. Cl.
*G06F 1/12* (2006.01)
(52) U.S. Cl. ...................... 713/400; 341/148
(58) Field of Classification Search ................ 712/400; 341/148; 713/400

See application file for complete search history.

(56) References Cited

U.S. PATENT DOCUMENTS

| | | | |
|---|---|---|---|
| 4,607,310 A | 8/1986 | Channel et al. ............. 361/149 |
| 5,341,403 A * | 8/1994 | Morley ........................ 375/354 |
| 5,373,204 A * | 12/1994 | Muramatsu et al. .......... 326/93 |
| 5,522,048 A * | 5/1996 | Offord ......................... 710/100 |
| 5,857,005 A * | 1/1999 | Buckenmaier .............. 375/357 |
| 5,898,303 A | 4/1999 | Umanskiy et al. .......... 324/210 |
| 6,137,240 A | 10/2000 | Bogdan ....................... 315/307 |
| 6,198,275 B1 | 3/2001 | Wolf et al. ............. 324/207.12 |
| 7,188,268 B2 * | 3/2007 | Vandenberg et al. ........ 713/400 |
| 2004/0145507 A1 * | 7/2004 | Geraghty et al. ........... 341/148 |

* cited by examiner

Primary Examiner—Chun Cao
Assistant Examiner—Vincent T Tran
(74) Attorney, Agent, or Firm—Westman, Champlin & Kelly (57) ABSTRACT

A microcontroller is provided, which includes a control unit (UC), at least one digital to analog converter (DAC) as a peripheral of the said control unit, and a buffer register located between the said control unit and the said converter, receiving data and a first command to transfer the said data from the said control unit. The microcontroller includes means of synchronisation of the said converter including a register inserted between the said buffer register and the said converter, the said register receiving a second transfer command independent of the said control unit.

10 Claims, 5 Drawing Sheets

| Bit | 7 | 6 | 5 | 4 | 3 | 2 | 1 | 0 | |
|---|---|---|---|---|---|---|---|---|---|
| | DAATE | DATS2 | DATS1 | DATS0 | - | DALA | DAOE | DAEN | DACON |
| Read / Write | R/W | R/W | R/W | R/W | R/W | R/W | R/W | R/W | |
| Initial Value | 0 | 0 | 0 | 0 | 0 | 0 | 0 | 0 | |

Fig. 7A

| Bit | 7 | 6 | 5 | 4 | 3 | 2 | 1 | 0 | |
|---|---|---|---|---|---|---|---|---|---|
| | - | - | - | - | - | - | DAC9 | DAC8 | DACH |
| | DAC7 | DAC6 | DAC5 | DAC4 | DAC3 | DAC2 | DAC1 | DAC0 | DACL |
| Read / Write | R/W | R/W | R/W | R/W | R/W | R/W | R/W | R/W | |
| | R/W | R/W | R/W | R/W | R/W | R/W | R/W | R/W | |
| Initial Value | 0 | 0 | 0 | 0 | 0 | 0 | 0 | 0 | |
| | 0 | 0 | 0 | 0 | 0 | 0 | 0 | 0 | |

Fig. 7B

| Bit | 7 | 6 | 5 | 4 | 3 | 2 | 1 | 0 | |
|---|---|---|---|---|---|---|---|---|---|
| | DAC9 | DAC8 | DAC7 | DAC6 | DAC5 | DAC4 | DAC3 | DAC2 | DACH |
| | DAC1 | DAC0 | - | - | - | - | - | - | DACL |
| Read / Write | R/W | R/W | R/W | R/W | R/W | R/W | R/W | R/W | |
| | R/W | R/W | R/W | R/W | R/W | R/W | R/W | R/W | |
| Initial Value | 0 | 0 | 0 | 0 | 0 | 0 | 0 | 0 | |
| | 0 | 0 | 0 | 0 | 0 | 0 | 0 | 0 | |

Fig. 7C

MICROCONTROLLER WITH SYNCHRONISED ANALOG TO DIGITAL CONVERTER

CROSS-REFERENCE TO RELATED APPLICATION

The present application claims priority of French Application No. FR 04/00507, filed Jan. 20, 2004, not in English.

FIELD OF THE INVENTION

The field of the invention is electronic components, and particularly microcontrollers. More precisely, the invention relates to a microcontroller comprising one or several integrated analog to digital converters (ADC).

The invention can be used in applications in all fields in which a process or a function including a microcontroller is required to generate variable analog voltage, particularly in the presence of strict time constraints.

Thus, the invention is used for example in applications in industrial logic controllers, power supplies, ballasts, household appliances, position slaving devices or electric motor control means.

BACKGROUND OF THE INVENTION

A microcontroller is generally composed of a central control unit, data and program memories, and peripherals. For example, one peripheral might be a communication interface, another peripheral might be a timer, and yet another might be an analog to digital converter (ADC) or sometimes a digital to analog converter (DAC).

At the moment few microcontrollers have an integrated DAC. Consequently, when there is no microcontroller with an integrated DAC, an external DAC has to be used controlled by a peripheral, the interface between the microcontroller and the DAC being made through a serial bus usually of the SPI (Serial Peripheral Interface) type, or the I2C (Inter Integrated Circuit) type, or directly in parallel.

However, regardless of whether the DAC is integrated into the microcontroller or is external, time management by the central processing unit of this microcontroller is not very precise. Since the microcontroller usually manages real time, the execution of a program may be modified by hardware or software interrupts being introduced, processed asynchronously by the control unit.

In the DAC, the beginning of the conversion is initiated by execution of an instruction in the control unit of the microcontroller, making a write in a buffer register.

In order to generate an analog wave shape F(t) on the DAC output, the converter has to be programmed so that it converts the value F(n) at precise instants $t_a$.

This technique is described in more detail later, with reference to FIGS. 1A, 1B and 2.

One major disadvantage of systems described according to prior art is that the conversions are not made at precise instants, with the control unit triggering the conversion at the DAC. The control unit is configured to deal with interrupts, consequently it delays real time instructions.

SUMMARY OF THE INVENTION

The main purpose of an embodiment of the invention is to overcome this disadvantage of prior art.

More precisely, one purpose of an embodiment of the invention is to provide a synchronisation interface used to make a digital to analog conversion at a precise instant, regardless of the internal activity of the microcontroller.

Another purpose of an embodiment of the invention is to avoid the need for means external to the microcontroller and therefore to integrate such a synchronisation interface into a microcontroller.

Another purpose of an embodiment of the invention is to provide such an interface that is easy to implement, while remaining inexpensive.

Yet another purpose of an embodiment of the invention is to obtain a variable analog voltage as a function of time and respecting a particular wave shape.

These objectives and others that will become clear later, are achieved using a microcontroller comprising a control unit (UC), at least one digital to analog converter (DAC) as a peripheral of the said control unit, and a buffer register located between the said control unit and the said converter, receiving data and a first command to transfer the said data from the said control unit.

According to an embodiment of the invention, such a microcontroller includes means of synchronisation of the said converter including a register inserted between the said buffer register and the said converter, the said register receiving a second transfer command independent of the said control unit.

Thus, an embodiment of the invention is based on a quite new and innovative approach to the generation of an analog wave shape on the output from a digital to analog converter, synchronisation of the conversion no longer being managed by the control unit which avoids delays due to processing of interrupts.

More precisely, the buffer register is controlled by the control unit, while the register inserted between the buffer register and the DAC is controlled by a transfer command independent of the control unit.

Preferably, the second transfer command is a hardware interrupt.

Advantageously, the hardware interrupt is generated by at least one timer internal to the microcontroller.

Thus, the data transfer between the buffer register and the register inserted between the DAC and the buffer register is triggered by a pulse sent by the timer that manages the time precisely, and is not dependent on interrupts, giving pulses at precise instants.

In particular, the hardware interrupt may correspond to:
end of counting of a time base;
an exit from a comparison at a pre-programmed time;
an external signal associated with collection of the internal time;
an external signal generating a software interrupt.

In one advantageous embodiment, the synchronisation means also include a register synchronisation block into which at least one synchronisation signal and the first transfer command are input.

These synchronisation signals originate from synchronisation sources and particularly timers.

Preferably, the digital to analog converter processes N-bit words and the control unit outputs data in the form of M-bit words, where M<N, and the microcontroller includes means of formatting an N-bit word from two M-bit words.

In particular, the formatting means include means of extracting an N-bit word from two M-bit words, selecting either the N high order bits, or the N low order bits.

According to one advantageous embodiment of the invention, M=8 and N=10.

Advantageously, the converter generates a predetermined wave shape.

Preferably, the converter outputs an analog signal to at least one of the elements belonging to the group containing:
industrial logic controllers;
power supplies;
ballasts;
household appliances;
position slaving devices;
electric motor control means.

BRIEF DESCRIPTION OF THE DRAWINGS

Other characteristics and advantages of the invention will become clearer after reading the following description of a preferred embodiment given as a simple illustrative and non-limitative example, and the attached drawings among which.

DETAILED DESCRIPTION OF ILLUSTRATIVE EMBODIMENTS

1. General Principle

The general principle of an embodiment of the invention is based on the insertion of a register between a buffer register and a digital to analog converter, inside a microcontroller such that the buffer register is controlled by a signal controlled by the control unit of the microcontroller and such that the said register is controlled by a signal independent of the control unit.

2. Existing Technique

Figure 1A:
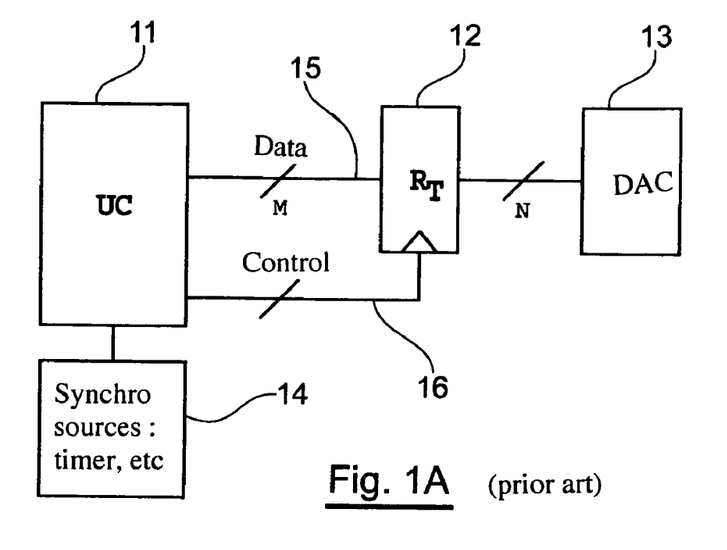
FIGS. 1A and 1B show a synchronisation interface for a digital to analog converter integrated into a microcontroller according to the state of the art.

The operation of a digital to analog converter (DAC) integrated into a microcontroller according to prior art is described with relation to FIG. 1A, in the case in which the microcontroller outputs data in the form of M-bit words and the DAC processes N-bit words, where N is less than or equal to M.

Such a microcontroller with an integrated DAC usually comprises:
a control unit 11;
a buffer register $R_T$ 12.
a digital to analog converter DAC 13;
synchronisation sources 14, for example timers;
data and program memory blocks (not shown).

As already mentioned, the beginning of the conversion at the DAC 13 is initialised by execution of a write instruction addressed to $R_T$, into the control unit UC 11 of the microcontroller. Therefore, the buffer register $R_T$ 12 receives data 15 from the control unit 11, along with a command to transfer these data, called the first transfer command 16.

However, some instructions will be delayed because the execution of the program within the control unit 11 can be modified by the acceptance of hardware or software interrupts; the microcontroller will then no longer be able to precisely synchronise the digital to analog conversion.

Figure 1B:
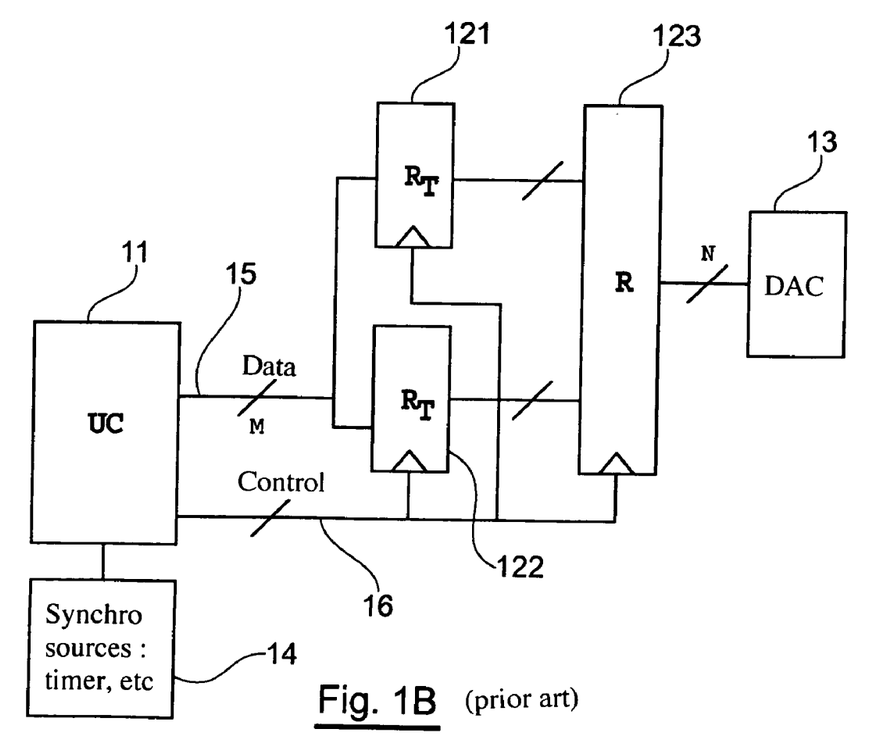

FIG. 1B shows another situation in which the microcontroller outputs data in the form of M-bit words and in which the DAC converts N-bit words, where N is greater than M.

In this case, the microcontroller firstly includes the same elements as those described in FIG. 1A, namely a control unit 11, a buffer register $R_T$, a digital to analog converter DAC 13, synchronisation sources 14, data and program memory blocks (not shown), but it also has an additional N bit register R 123 necessary to increase the size of the data bus to N bits.

In this embodiment, the contents of the register $R_T$ are implemented on two registers $R_T$ 121 and $R_T$ 122 with size M. A word with size N is then built up in the register R 123, from two words with size M in registers $R_T$ 121 and 122.

As mentioned above, the beginning of the conversion at the DAC 13 is initialised by execution of a write instruction addressed to register R 123, in the microcontroller control unit UC 11. Therefore the register R 123 receives a command to transfer these data, called the first transfer command 16, from the control unit 11.

Figure 2:
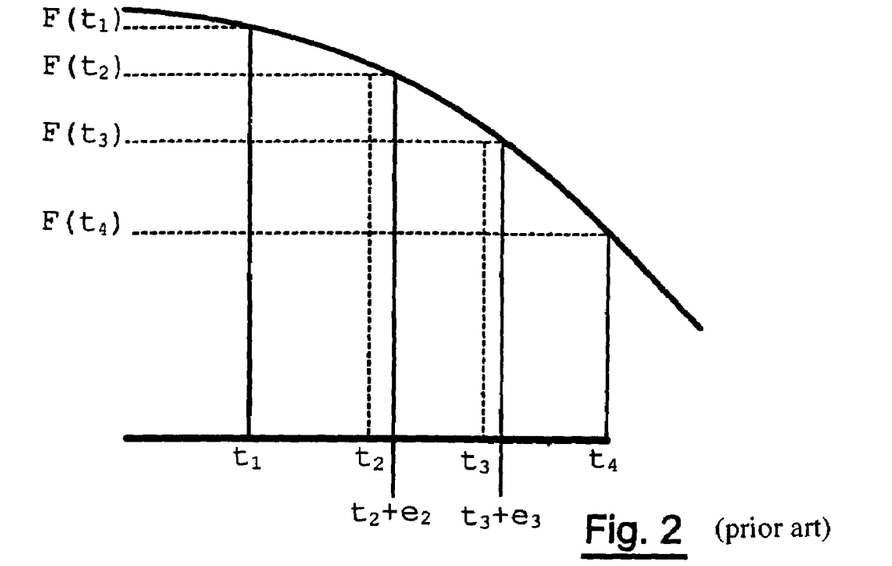
FIG. 2 shows an analog wave shape at the output from a DAC according to prior art as shown in FIG. 1A.

Thus as shown in FIG. 2, the digital to analog conversions are not done at precise instants $t_i$ (where i is a relative integer), but at instants $t_i+e_i$ where $e_i$ is equal to a delay due to interrupts 25 managed by the control unit 11. Consequently, the shape of the analog wave F(t) at the output from the DAC is incorrect, since the DAC converts a digital value at instant $t_n+e_n$ and not at instant $t_n$.

3. Embodiment of the Invention

Case $N \leq M$

Figure 3A:
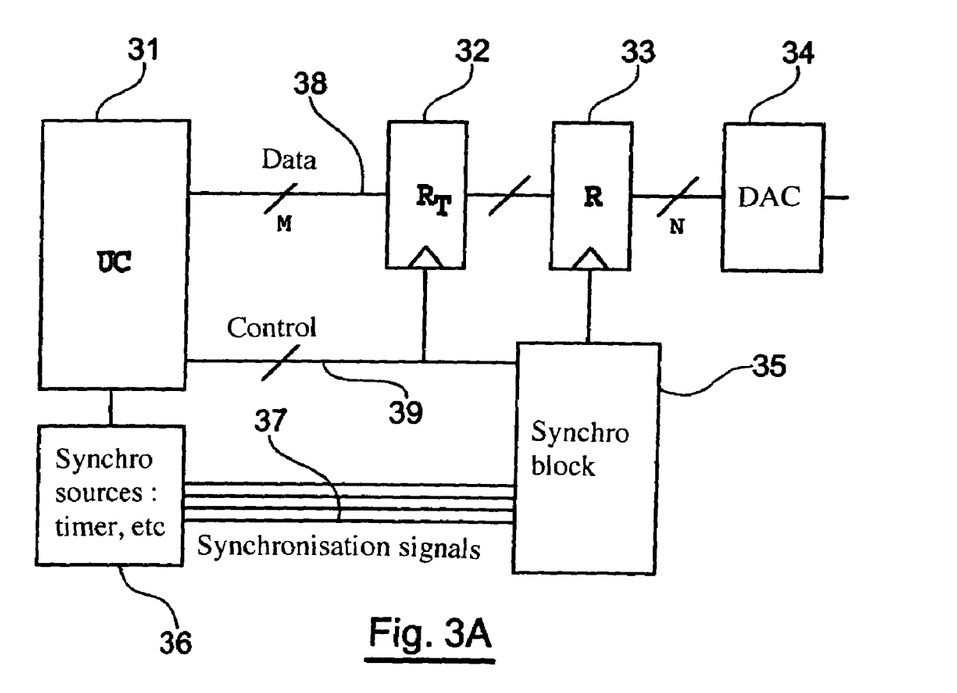
FIGS. 3A and 3B show a synchronisation interface for a digital to analog converter integrated into a microcontroller according to the invention.

FIG. 3A shows a synchronisation interface capable of eliminating inaccuracies in the digital to analog conversion within a microcontroller according to an embodiment of the invention, when the microcontroller outputs data in the form of M-bit words and the DAC converts N-bit words, where N is less than or equal to M.

The microcontroller includes firstly elements shown in FIG. 1A; a control unit 31, a buffer register $R_T$ 32, a digital to analog converter 34, different synchronisation sources 36, data and program memory blocks and possibly other peripherals.

According to the embodiment, a register R 33 inserted between the buffer $R_T$ 32 and the DAC 34, and a synchronisation block 35, are also integrated into the microcontroller.

The purpose of the synchronisation block 35 is to assure that the digital to analog conversion is done at a precise instant, regardless of the internal activity of the microcontroller and particularly its control unit 31.

To achieve this, the synchronisation block 35 receives synchronisation signals 37 from the control unit 31 or from synchronisation sources 36, and particularly timers, as input.

These signals 37 are hardware interrupts, and may correspond to one of the following:
end of counting of a time base that provides a periodic interrupt;
an interrupt at a pre-programmed time (for example an exit from a comparison);
an external signal generating a software interrupt;
an external signal generating an interrupt associated with collection of the internal time.

The synchronisation interface includes two conversion registers:
- the register R 33 directly connected to the DAC 34, for which the digital contents correspond to the analog value output from the DAC 34;
- the buffer register $R_T$ 32 for which the digital contents initially correspond to the future analog value.

As for the system according to prior art described in FIG. 1A, the buffer register $R_T$ 32 receives data 38 and a command 39 to transfer these data called the first transfer command 39, from the control unit 31.

The synchronisation block 35 is then used to control the final transfer of data between the buffer register $R_T$ 32 and the register R 33 using a second transfer command independent of the control unit 31. This transfer is actually done when a transition is detected in a synchronisation signal.

In one preferred embodiment of the invention, the synchronisation signal is output from a timer. The data transfer between the buffer register $R_T$ 32 and the register 33 is then triggered by a pulse, the timer managing the time precisely and not dependently on interrupts, by outputting pulses at precise instants.

Case N>M

Figure 3B:
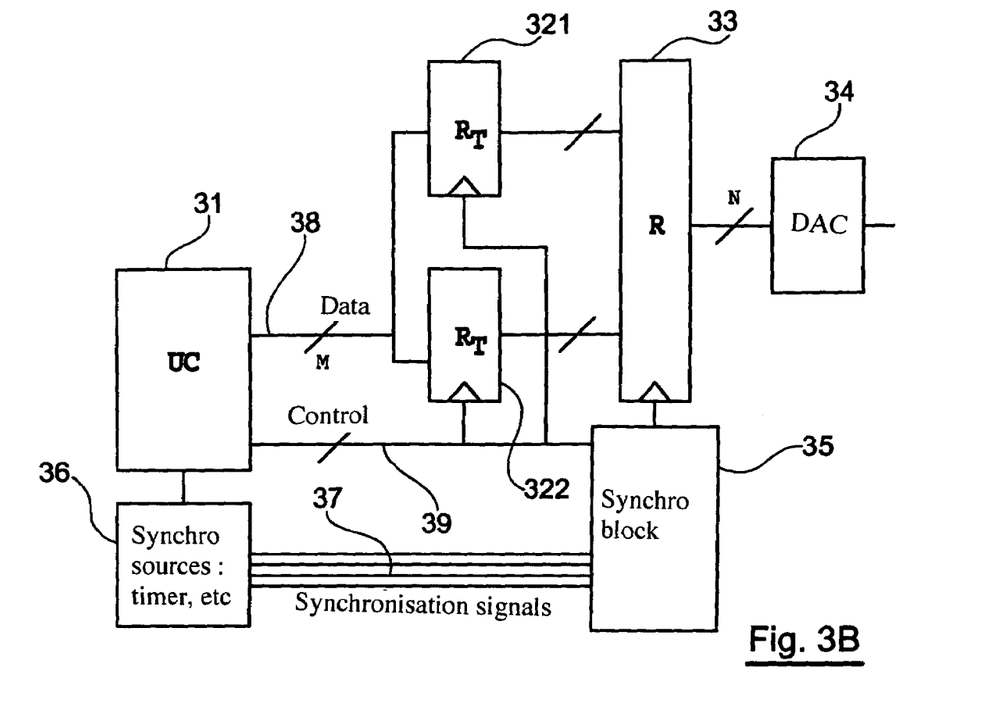

FIG. 3B shows the case in which the microcontroller outputs data in the form of M-bit words and in which the DAC processes N-bit words, where N is greater than M.

In this case, the microcontroller has the same elements as those described in FIG. 3A. However, in this embodiment, the contents of register $R_T$ are stored in two registers $R_T$ 321 and $R_T$ 322 with size. M. A word with size N is then built up in register R from the two words with size M in registers $R_T$ 321 and $R_T$ 322. The means of formatting an N-bit word from two M-bit words are described in more detail below, with reference to FIG. 5. "DETAILED EXAMPLE" SECTION As described above, the synchronisation block 35 receives input synchronisation signals 37 from the control unit 31 or synchronisation sources 36, and particularly timers.

This synchronisation block 35 is used to control final transfer of data between buffer registers $R_T$ 321 and $R_T$ 322 and register R 33, using a second transfer command independent of the control unit 31. This transfer is made as soon as a transition is detected in a synchronisation signal.

4. Implementing an Embodiment of the Invention

Figure 4:
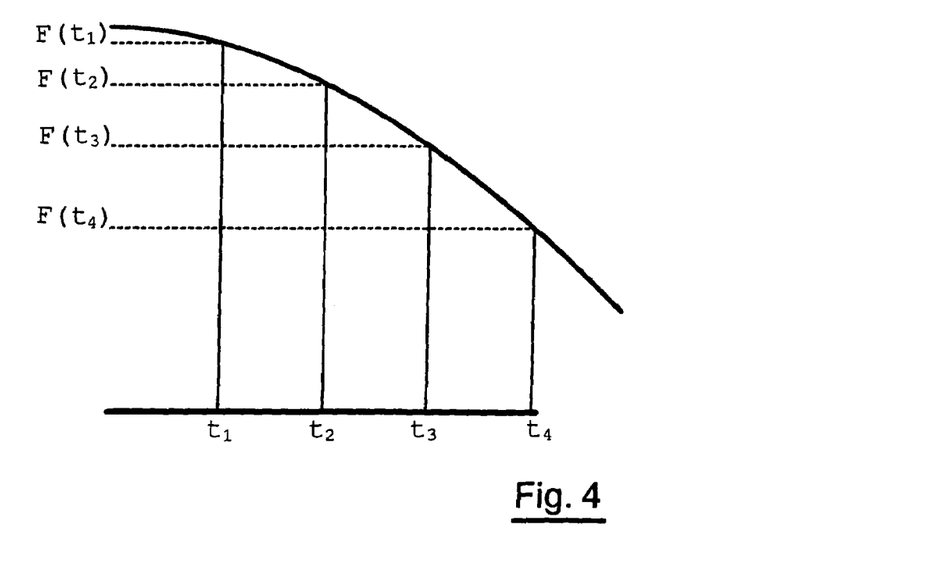
FIG. 4 shows an analog wave shape at the output from the DAC shown in FIG. 3A.

As shown in FIG. 4, digital to analog conversions are then made at precise instants $t_i$, the conversion being synchronised with an event originating from the timer (or another synchronisation source) and not, as in prior art, from the control unit, that delays instructions as a function of interrupts.

In another embodiment, the synchronisation signal originates from an interrupt at a pre-programmed time corresponding to the output from a comparison. The value $t_1$ is programmed in a comparison register, and the value $F(t_1)$ is programmed in the buffer conversion registers $R_T$ 321 and 322. When the interrupt corresponding to $t_1$ takes place, the value $t_2$ is programmed in the comparison register and the value $F(t_2)$ is programmed in the buffer conversion registers $R_T$ 321 and 322. When the interrupt corresponding to $t_{i-1}$ takes place, the value $t_i$ is programmed in the comparison register and the value $F(t_i)$ is programmed in the buffer conversion registers $R_T$ 321 and 322, where i is a relative integer. This summarises a wave shape $F(t_i)$.

Obviously, the invention is not limited to synchronisation signals internal to the microcontroller, and synchronisation sources 36 may also be internal or external to the microcontroller.

Therefore, an embodiment of the invention eliminates uncertainties about conversion times due to the real time activity of the microcontroller and generates an analog wave shape with less distortion.

5. Detailed Example

Figure 5:
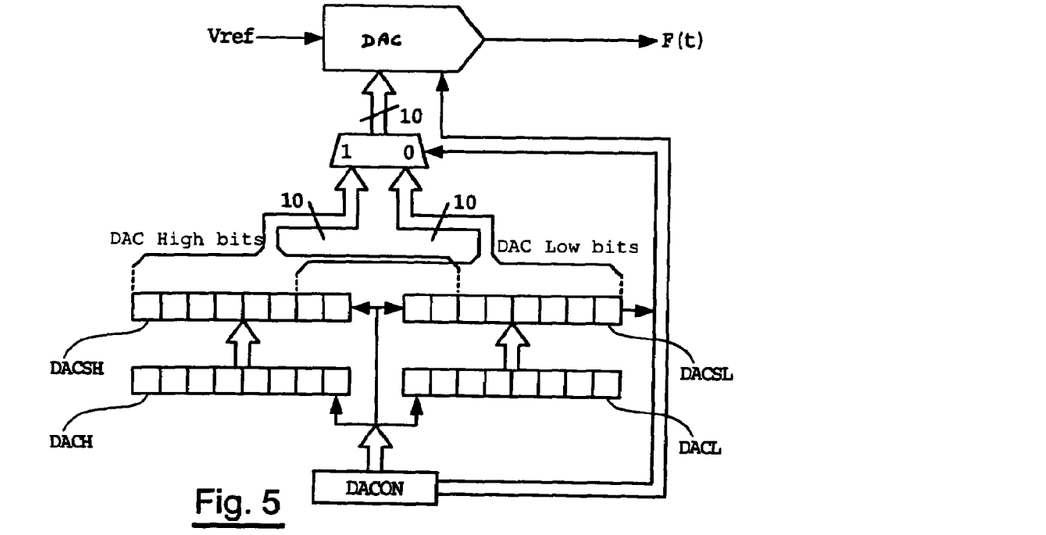
FIG. 5 shows an example of a DAC according to a particular embodiment of the invention.

We will now show an example of a digital to analog converter according to a particular embodiment of the invention, with reference to FIG. 5. For further details refer to the complete diagram for such a DAC, shown in FIGS. 6, 7A, 7B and 7C and described in the appendix.

In this particular embodiment, the synchronisation of the DAC is implemented in an AVR type 8-bit (brand held by the holder of this patent application) microcontroller. This type of microcontroller may be used particularly in lighting systems.

The control unit of such a microcontroller outputs data in the form of 8 bit words, while the DAC processes 10 bit words in this embodiment. Consequently, it is decided to implement the register R and the buffer register $R_T$ on two 8-bit registers.

These two pairs of registers widen the data bus from 8 to 10 bits and perform the synchronisation function.

Since the register R is directly connected to the DAC, it is important to format the contents of the register R implemented on two 8-bit registers (the register DACSH and the register DACSL) to form a 10-bit word input to the DAC.

Preferably, the contents of the register R are formatted by choosing:
- either to keep the 10 high order bits of the register R corresponding to the 8 bits of the DACSH register and the first 2 bits of the DACSL register, to form a 10 bit "DAC High bits" word;
- or to keep the 10 low order bits of register R corresponding to the last 2 bits of the DACSH register and the 8 bits of the DACSL register to form a 10 bit "DAC Low bits" word;
- these 10 bits being selected among the 16 bits (two 8 bit words) combinationally at the output from the DACSH and DACSL registers.

The digital to analog converter interface includes five 8 bit registers, namely the DACH register and the DACL register (corresponding to the buffer register $R_T$), the DACSH register and the DACSL register (corresponding to the register R) and the DACON register. An analog wave shape F(t) is obtained at the output from the DAC.

The DACON (Digital-to-Analog Conversion Control Register) register is used for checking the digital to analog conversion. It enables configuration of the DAC by choosing whether to enable or disable synchronisation, selection of the interrupt source (for example an external signal, an exit from comparison, or an end of counting of an external or internal time base, etc.) or selection of the 10 bit word corresponding to the high order bits (DAC High bits) or the low order bits (DAC Low bits).

Therefore, this type of DAC can process N-bit words, even if the control unit outputs data in the form of M-bit words, where M is less than N, by combining several M-bit words. In particular, many applications use 8 bit words (M=8).

This invention is particularly useful for any application that has to generate a variable voltage with strict time constraints, for example such as a position slaving application, an electric motor control application, a welding station application, an instrumentation application, or a power supply application.

6. Appendices

Figure 6:
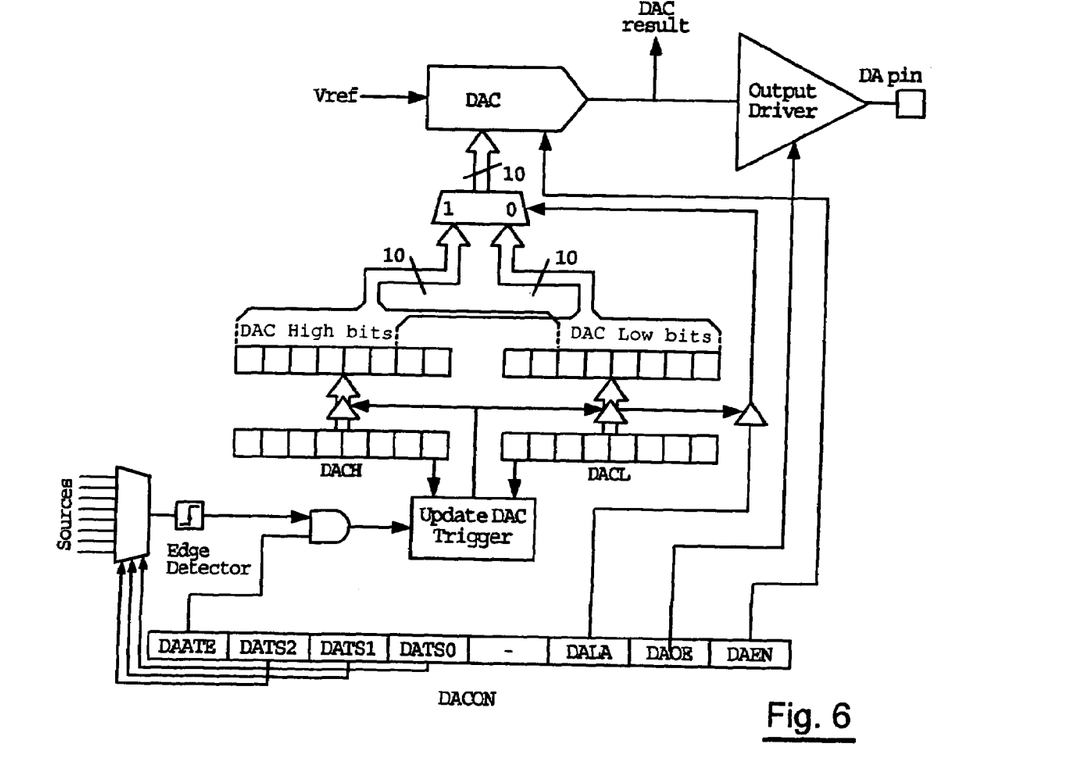
FIG. 6 shows a DAC like that shown in FIG. 5, in more detail.

Operation:

The Digital Analog Converter (DAC) shown in FIG. 6 generates an analog signal as a function of the contents of DAC write registers.

It is possible to update the DAC input values taking account of the different events originating from "triggers", in order to have a precise control sampling frequency.

Figure 7A:
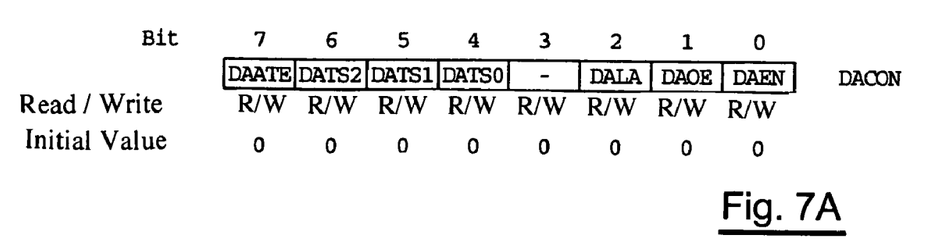
FIGS. 7A, 7B and 7C show the contents of the different registers of a DAC like that shown in FIG. 6.
Figure 7B:
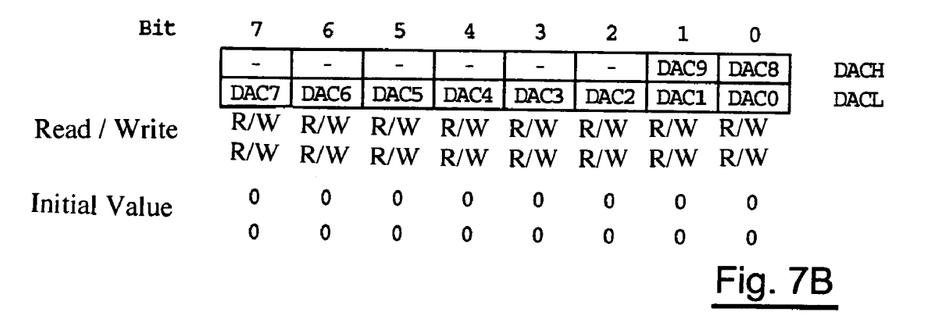
Figure 7C:
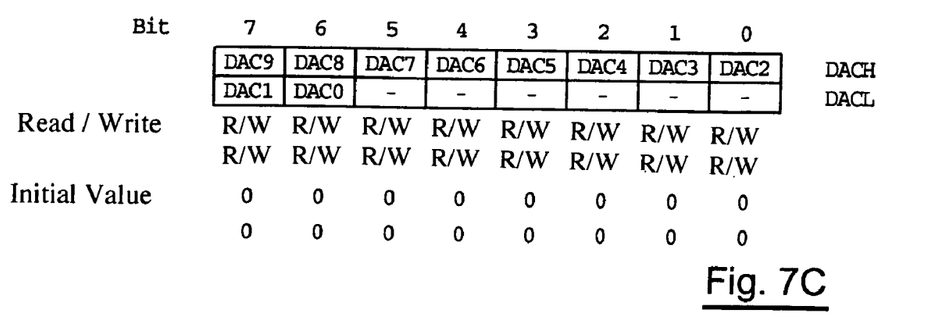

Control Registers:

The DAC is controlled by three dedicated registers:

the Digital to Analog Conversion Control Register (DACON), used for configuration of the DAC and shown in FIG. 7A;

the DACH and DACL registers, used for data to be converted and shown in FIGS. 7B and 7C.

The DACON register (FIG. 7A):

Bit 7—DAATE (DAC Auto Trigger Enable Bit).

Set this bit to '1' to update the DAC input value on a rising front of the trigger, also called the synchronisation signal, selected from the DATS2, DATS1, DATS0 bits in the DACON register.

Leave it equal to '0' to automatically update the DAC input when a value is written in the DACH register.

Bit 6:4—DATS2, DATS1, DATS0 (DAC Trigger Selection bits)

These bits are only necessary if the DAC is working in "auto trigger" mode, in other words when the DAATE bit is used.

As shown in table 1, the three DATS2:0 bits are used to select the interrupt that will trigger an update to the DAC input values. The update will be triggered by a rising front in a selected interrupt signal, regardless of whether or not the interrupt is enabled.

TABLE 1

Selection of the trigger event (DAC Auto trigger source)

| DATS2 | DATS1 | DATS0 | Description |
|---|---|---|---|
| 0 | 0 | 0 | Analog comparator 0 |
| 0 | 0 | 1 | Analog comparator 1 |
| 0 | 1 | 0 | External interrupt request 0 |
| 0 | 1 | 1 | Comparison Timer/Counter 0, value A |
| 1 | 0 | 0 | Timer/Counter 0, overrun |
| 1 | 0 | 1 | Comparison Timer/Counter 0, value B |
| 1 | 1 | 0 | Timer/Counter 1, overrun |
| 1 | 1 | 1 | Comparison Timer/Counter 0, collection event |

Bit 2—DALA (Digital to Analog Left Adjust)

Set this bit equal to '1' to write data to be entered into the DAC from the left.

Set it equal to '0' to enter data from the right.

The DALA bit has an incidence on the configuration of DAC write registers. When the value his bit is modified, the output from the DAC is modified at the time of the next write in the DACH register.

Bit 1—DAOE (Digital to Analog Output Enable Bit)

Set this bit equal to '1' to output the result of the conversion on the external DA pin, and leave it equal to '0' to keep the result inside the DAC.

Bit 0—DAEN (Digital to Analog Enable bit)

Set this bit equal to '1' to enable the digital to analog converter.

Set it equal to '0' to disable it.

Converter input registers: DACH and DACL

The DACH and DACL registers contain the value to be converted. Writing into DACL prevents updating the value to be converted until the DACL register has been updated. Thus, the normal means of writing a value to be converted is firstly to write DACL and then DACH.

The input value can be adjusted from the left, to make it easy to work with 8-bit words. Thus, the value of the DAC can be updated simply by writing into the DACH register.

The contents of the DACH register depend on the configuration selected from the DALA bit.

When this DALA bit is equal to '0', as shown in FIG. 7B, the first point is to write data to be input into the DAC from the right. Therefore, the first 8 data bits are written into the DACL register and the last 2 bits are written into the DACH register.

When this DALA bit is equal to '1' as shown in FIG. 7C, the data to be input into the DAC are written from the left. Therefore, the first 8 data bits are written into the DACH register and the last 2 bits are written into the DACL register.

The DAC must update two registers to convert 10-bit words. To prevent intermediate values, the DAC input values that are actually converted into an analog signal are stored in a register that cannot be accessed by program, and is not shown (corresponding to the DACSH and DACSL registers in FIG. 5). In normal mode, the value to be converted is updated when the DACH register is written.

If the DAATE bit is set equal to '1', the DAC input values will be updated when the event takes place on the trigger, selected from the DATS2:0 bits, immediately after the DACH register has been written.

If the DAATE bit in the DACON register is set equal to '0', the DAC is in an automatic update mode. Writing in the DACH register automatically updates the DAC input values with the contents of the DACH and DACL registers.

This means that changing the contents of the DACL register has no effect on the output from the DAC until the DACH register has been updated.

Thus, to work with 10-bit words, the first step is to write into the DACL register before writing into the DACH register. When working with 8-bit words, writing into DACH will cause the DAC to be updated.

Although the present invention has been described with reference to preferred embodiments, workers skilled in the art will recognize that changes may be made in form and detail without departing from the spirit and scope of the invention.

What is claimed is:

1. A microcontroller comprising:
   a control unit (UC),
   at least one digital to analog converter (DAC) as a peripheral of said control unit,
   a buffer register located between said control unit and said converter, receiving data and a first command to transfer said data from said control unit, and
   means of synchronisation of said converter including a register inserted between said buffer register and said converter, said register receiving a second transfer command independent of said control unit when a transition in a synchronisation signal, corresponding to a hardware interrupt, is detected.

2. The microcontroller according to claim 1, wherein said hardware interrupt is generated by at least one timer internal to the microcontroller.

3. The microcontroller according to claim 1, wherein said hardware interrupt corresponds to at least one of the elements belonging to the group comprising:
- end of counting of a time base;
- an exit from a comparison at a pre-programmed time;
- an external signal associated with collection of the internal time; and
- an external signal generating a software interrupt.

4. The microcontroller according to claim 1, wherein the said synchronisation means also include a synchronisation block for the said register into which at least one synchronisation signal and the said first transfer command are input.

5. The microcontroller according to claim 1, wherein the said digital to analog convener processes N-bit words, and the control unit outputs the said data in the form of M-bit words, where M<N, and the said microcontroller comprises means for formatting an N-bit word from two M-bit words.

6. The microcontroller according to claim 5, wherein the said formatting means comprise means for extracting an N-bit word from two M-bit words, selecting either the N high order bits, or the N low order bits.

7. The microcontroller according to claim 5, wherein M=8 and N=10.

8. The microcontroller according to claim 1, wherein the said converter generates a predetermined wave shape.

9. The microcontroller according to claim 1, wherein the said converter outputs an analog signal to at least one of the elements belonging to the group containing:
- industrial logic controllers;
- power supplies;
- ballasts;
- household appliances;
- position slaving devices;
- electric motor control means.

10. A microcontroller comprising:
- a control unit (UC),
- at least one digital to analog converter (DAC) as a peripheral of said control unit,
- a buffer register located between said control unit and said convener, receiving data and a first command to transfer said data from said control unit, and
- a further register inserted between said buffer register and said converter, said further register receiving a second transfer command independent of said control unit when a transition in a synchronisation signal, corresponding to a hardware interrupt, is detected.

* * * * *

UNITED STATES PATENT AND TRADEMARK OFFICE
CERTIFICATE OF CORRECTION

| | | |
|---|---|---|
| PATENT NO. | : 7,353,417 B2 | Page 1 of 1 |
| APPLICATION NO. | : 11/038654 | |
| DATED | : April 1, 2008 | |
| INVENTOR(S) | : Jean Desuche et al. | |

It is certified that error appears in the above-identified patent and that said Letters Patent is hereby corrected as shown below:

Title page, Item (73), please delete "Nantes Cedex" and insert --Nantes Cedex 3--.

Column 9, line 19, please delete "convener" and insert --converter--.

Column 10, line 17, please delete "convener" and insert --converter--.

Signed and Sealed this

Twenty-fourth Day of June, 2008

JON W. DUDAS
*Director of the United States Patent and Trademark Office*